Oct. 11, 1960 G. O. PHILIP ET AL 2,955,488
WRENCH MECHANISM
Filed March 24, 1958 4 Sheets-Sheet 1

INVENTORS.
GEORGE O. PHILIP
NORMAN MAC DONALD JR
BY
ATTORNEY

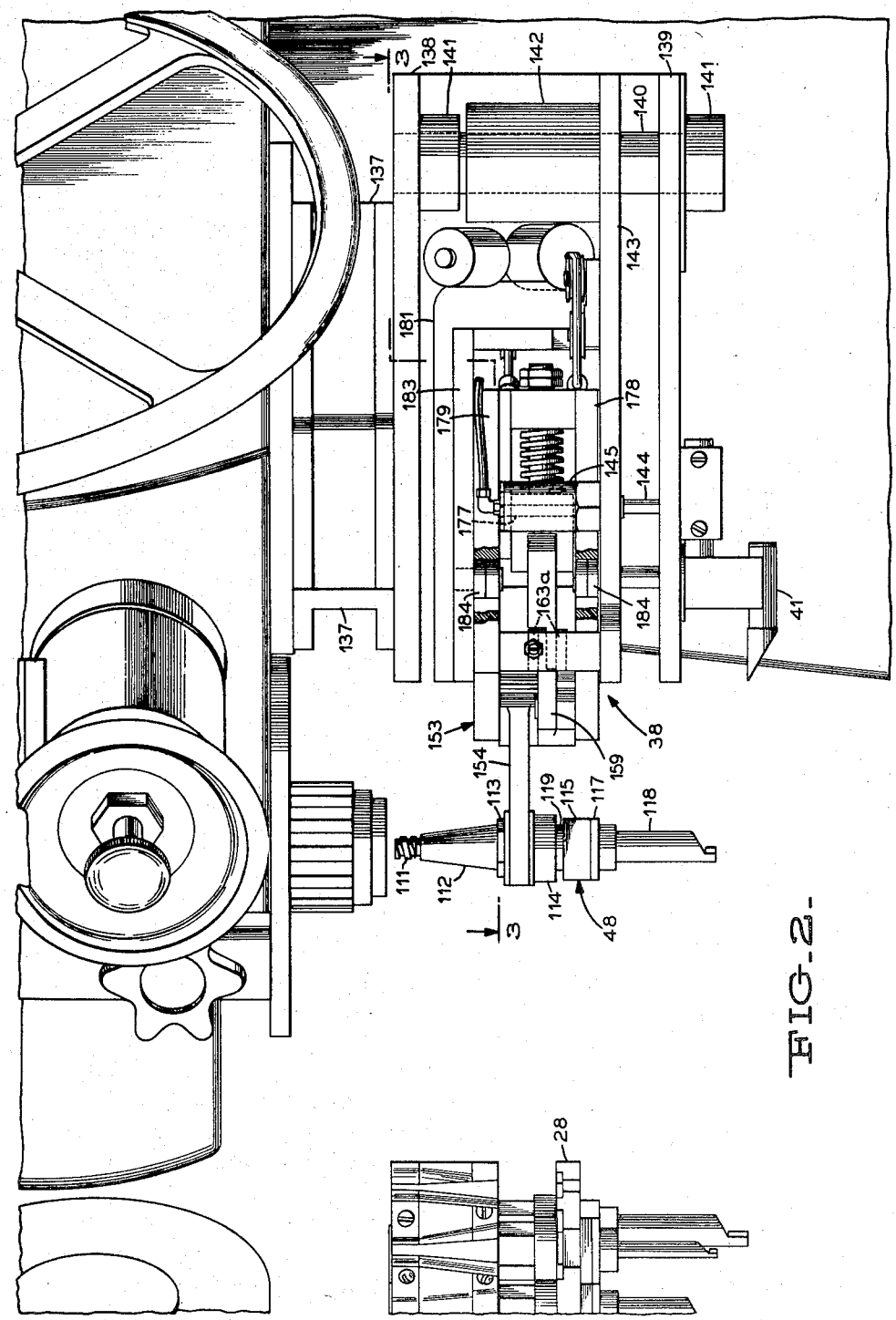

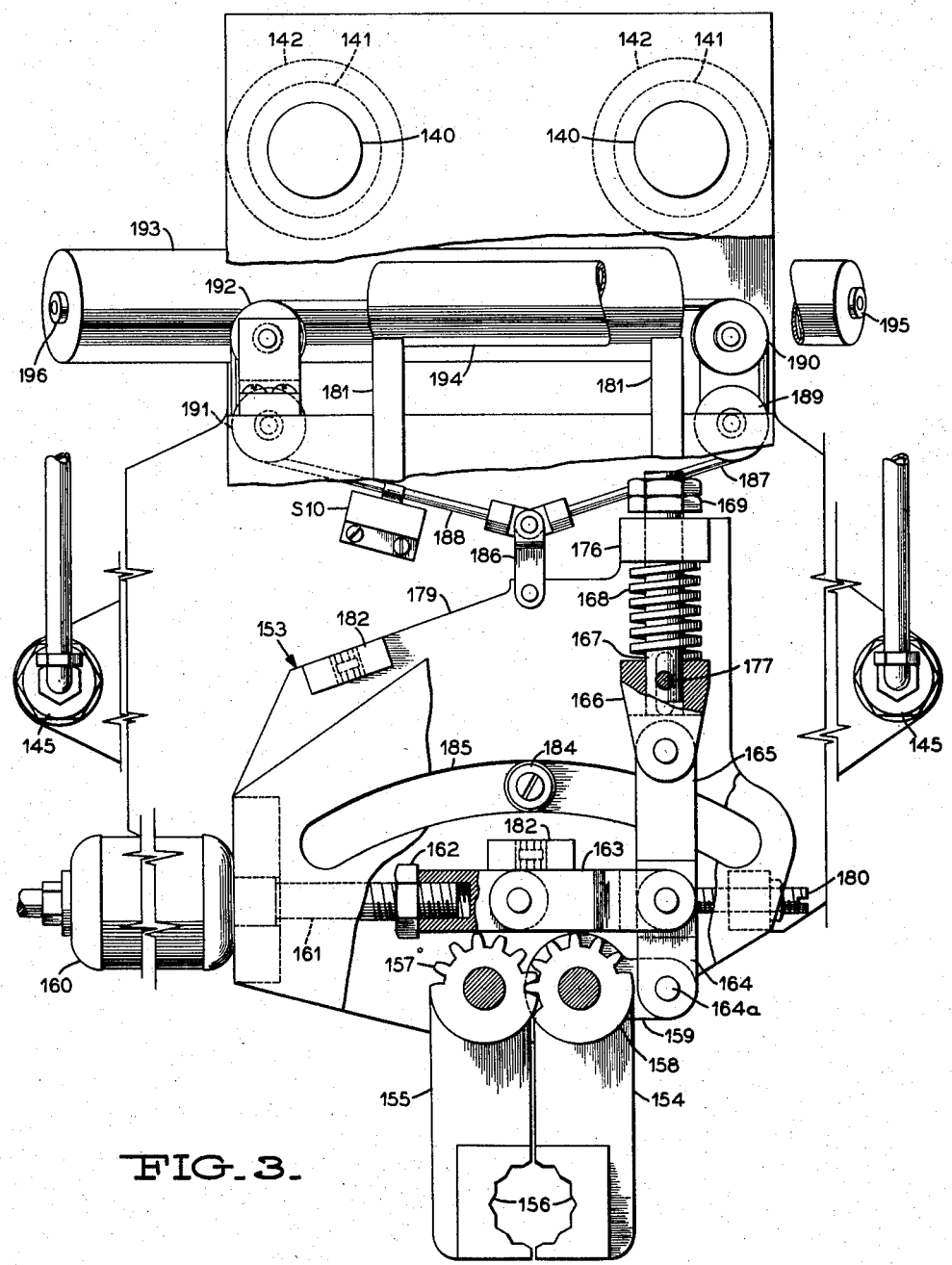

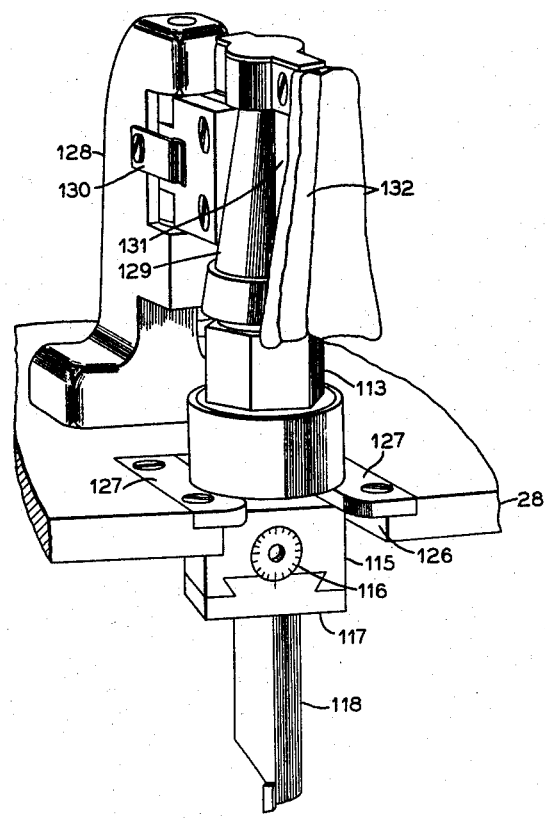
FIG_4_
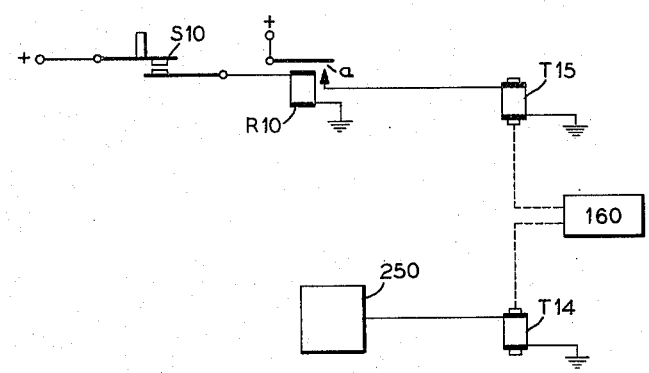
FIG_5_

United States Patent Office 2,955,488
Patented Oct. 11, 1960

2,955,488
WRENCH MECHANISM

George O. Philip, Vestal, and Norman MacDonald, Jr., Endicott, N.Y., assignors to International Business Machines Corporation, New York, N.Y., a corporation of New York Filed Mar. 24, 1958, Ser. No. 723,271

4 Claims. (Cl. 77—4)

This invention relates to a tool gripping mechanism and in particular to a mechanism selectively operable to secure a tool tendered thereto and to release the same.

The present invention finds particular utility in the apparatus shown in the application to M. Morgan, Serial No. 705,701, filed December 27, 1957, now Patent 2,901,927, issued September 1, 1959. In that system, presently to be described, a tool storage matrix contains a plurality of tools which are selectively tendered to a jig boring machine which in turn tenders the selected tool to the matrix when an operation has been completed.

The present invention acts as an intermediary in the interchange of tools from storage matrix to machine.

An object of this invention, therefore, is to provide a mechanism for accepting and tendering a tool from a storage carrier to an operative mechanism.

A further object of this invention is to provide a mechanism to hold a tool for insertion into the spindle of a boring machine until the tool is properly tightened in said spindle.

Another object of this invention is to provide a wrench mechanism adjustable to control the tightness with which a tool is inserted into the spindle of a boring machine.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 is a side elevation view of the wrench mechanism and the tool storage matrix.

Fig. 3 is a top plan view of the wrench mechanism taken along line 3—3 of Fig. 2.

Fig. 4 is an isometric view of a tool carried in the tool matrix.

Fig. 5 is the electrical control circuit for the wrench mechanism.

Figure 1:
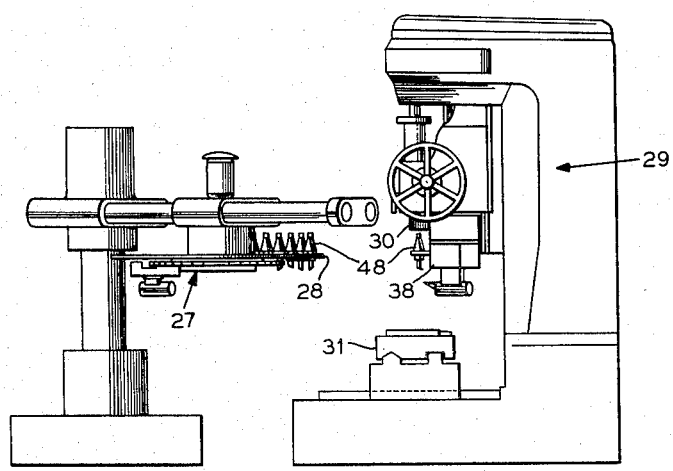
Fig. 1 is an illustration of the apparatus with which the present invention would be used.

The present invention 38 is shown, Fig. 1, in the system in which it is utilized to clearly demonstrate its mode of operation. A more detailed explanation of the system is given in the application mentioned supra. A tool storage matrix 27 includes a matrix plate 28, see also Fig. 2, in which a plurality of tools 48 are stored. By suitable controls, the plate 28 may be rotated to bring a desired tool into line with the boring machine 29. The boring machine 29 includes a worktable 31 and a spindle 30 into which a tool 48 is adapted to be inserted. A wrench mechanism 38, which is the instant invention, is shown holding a tool 48 preparatory to the insertion of the tool 48 into the spindle 30 or into a slot on the matrix plate 28.

The tool 48, Figs. 2 and 4, consists of a threaded end 111 for insertion into the spindle of the boring machine, a tapered portion 112 for insuring precise alignment of the center line of said tool with the center line of spindle 30, when the tool is firmly secured in the spindle 30, a hexagonally shaped nut 113, a collar 114 directly below said nut 113 and a reduced shaft member 119 terminating in a square block 115. This combination may be machined from one piece or constructed from the elements. A screw 116, Fig. 4, threaded in said block 115 has its threads meshing with a threaded block 117 keyed therein for relative movement to establish centering of tool bits 118 to be placed in said last-mentioned blocks 117. The tool bits per se are fastened to the lower block in any desired manner. The tool bit holders 111—117 are utilized in order to obtain a constant distance between the top of the tool storage plate 28 and the threaded portion 111 to be inserted into the spindle 30 since the tools themselves vary in length.

The slots 126 in the storage plate, Fig. 4, have keys 127 secured to the periphery of the slots 126 which slide in the way 119 formed between the collar 114 and square shanks 115 of the tool holder. A stanchion 128 is mounted on said tool storage plate 28 directly behind each slot 126 and has journaled therein two wiping sections 129 urged by flat springs 130 into engagement. These wiping members are formed to conform to the shape of the shank 112 of the tool holder and have radially extending fingers 131 containing chamois 132 for wiping the shank of the tool when it is inserted into and removed from the slot 126 for storage.

The wrench mechanism 38 of the present invention is fixed beneath the head of the boring machine as shown clearly in Fig. 2, and performs two separate and distinct functions:

(1) To remove or insert a tool into the tool storage plate 28.

(2) To hold the tool for insertion into the spindle 30 or remove the tool from the spindle.

The wrench mechanism 38 is secured by channel members 137 directly beneath the head of the boring machine 29 in any suitable manner such as by welding or bolting. As shown in Fig. 2, a tool 48 is being held by the wrench mechanism 38 for insertion into the spindle 30 of the boring machine 29. The storage plate 28 is moved to a position removed from the spindle and will not be moved back into operative position until the tool now in the mechanism is to be replaced in the storage plate.

The wrench mechanism 38 is formed of plates 138 and 139 spaced apart by members 140 secured to these plates by suitable collars 141. Bearings 142 are connected to a vertically movable plate 143 to allow this plate to move up and down on the members 140 under the control of piston rods 144 driven by electrically controlled air cylinders 145.

The mechanism mounted on the vertically movable plate 143 will be called the wrench assembly 153 and is the actual mechanism used to grasp the tool. In its raised position, the jaws 154 and 155 of the wrench assembly 153 are aligned with the hexagonal nut 113 of the tools carried in the storage plate 28 and in this position accepts or tenders the tool to or from the storage plate. The shaft 144 of cylinders 145 operates to move the assembly upwards when air is introduced therein.

The assembly 153 is lowered when spindle 30 is to release or accept a tool held by jaws 154 and 155. This feature is to allow a resilient cushion for spindle movement in a downward position when spindle 30 releases a tool and in an upward position when spindle 30 accepts a tool. In the first case, air is expelled from cylinder 145 at the instant spindle 30 is made to rotate counter-clockwise. When the thread 111 of tool holder 48 has been released from spindle 30, air is again introduced into cylinder 145, spindle rotation stopped, and spindle 30 withdrawn vertically to its uppermost position. The wrench plate assembly 153 and tool holder 48 return to the tool holder receiving position.

In the second case, when accepting a tool holder 48 into the spindle 30, air is allowed to escape from cylinder 145 when the spindle 30 makes contact with thread 111 of tool 48 until an equivalent length of thread 111 has been traversed. Air is again admitted to cylinder 145 and its cushioning action permits prompt engagement of thread 111 into the cavity of spindle 30 when spindle 30 is caused to rotate clockwise.

The assembly 153 consists essentially, see Fig. 3, of the jaws 154 and 155 in which is formed a series of teeth 156 which, when the jaws 154 and 155 are closed, form a wrench of a proper dimension to hold a tool nut 113 securely. Gear sectors 157 and 158 are formed on the opposite end of the jaws and mesh together to operate as a unit. The sector 158 is connected to a bell crank 159 operated by means to be presently described to connect both jaws 154 and 155 to a source of motive power 160. It can be seen that by moving the bell crank 159 counter-clockwise, the jaws will open while movement clockwise will close the jaws.

An electrically controlled air cylinder 160 has a shaft 161 connected thereto for movement. This shaft 161 is connected to a member 163 by means of a nut 162. Member 163 has a bifurcated portion 163a connecting shaft 161 to arms 164 and 165. The arm 164 is connected by pivot 164a to the bell crank 159. The arm 165 has connected, at its opposite end thereof, a spring biasing mechanism comprising connector 166, shaft 167 and a spring 168. This mechanism functions to control the force on the bell crank when the shaft is in its extended position and can be adjusted by a nut 169 to limit movement of shaft 167. The shaft 167 is guided by a bearing 176 and a pin 177 which is connected between plates 178 and 179, see Fig. 2.

A set screw 180 is placed adjacent the linkage formed at bifurcated member 163 to adjust the maximum permissible excursion of the cylinder shaft 161. Plate 183 is supported by means of L-shaped members 181 secured to plate 143. Between plates 143 and 183, the wrench mechanism proper is movably mounted on bearings 182, Fig. 3, of which only two have been shown. This mechanism consists of plates 178 and 179 which are keyed to plates 143 and 183 by means of bearings 184 secured to plates 143 and 183 and riding in ways 185, Fig. 3, formed in plates 143 and 183. The ways 185 have a radius of curvature such that the center of jaws 154 and 155 forms the center point of a circle including the radius of curvature. A link 186, Fig. 3, is connected to the top plate 179 to the bottom plate 178 and wire cables 187 and 188 are passed from this linkage around a series of pulleys 189, 190 and 191, 192 to spring biasing mechanisms 193 and 194. The spring biasing mechanisms 193 and 194 used here comprise a container holding a spring attached at one end to the cable and at the other end to an adjusting screw 195, 196 to enable the proper bias to be applied to center the movable assembly. Adjacent cable 188 is a switch S10 which is actuated by movement of cable 188 when the assembly moves in a clockwise direction, looking at Fig. 3. This switch S10 is connected to a relay R10, Fig. 5, which operates when switch S10 is closed to close a contact "a" of relay R10, Fig. 5, and actuate the solenoid T15 which releases the air pressure to air cylinder 160. A control 250 controls a solenoid T14 to apply air pressure to cylinder 160 when the jaws of the wrench mechanism are to be closed.

When the tool holder is being drawn into spindle 30 by the engagement of the internal thread of spindle 30 with the external thread of the tool holder 48, the external taper of the tool holder contacts the internally matched taper of the spindle resulting in a large increase in torque to cause movement of this mechanism in a clockwise direction around the center joint of the jaws 154 and 155 and consequently actuation of the switch S10 which in turn, through the circuitry described, releases the pressure to the air cylinder 160. This action permits the tightening of the tool into the spindle of the jig borer to a degree determined by the spring bias which is placed on the cables 187 and 188 by the mechanism 194. Upon release of the tool holder, the spring tension returns the mechanism to a central position.

In releasing a tool in the spindle, the movement of the assembly 178 and 179 in a counter-clockwise direction will not cause actuation of the switch S10 and the tool will be loosened and held by the mechanism.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, wrench means, an opening formed on said wrench means having a periphery formed to engage a tool placed therein, support means, means for movably mounting said wrench means on said support means, said mounting means being fixed to provide rotational movement of said wrench means about a center line through said opening on said wrench means and resilient biasing means mounted on said support means and attached to said wrench means for fixing the position of said wrench means with respect to said support.

2. The combination of claim 1, wherein said wrench means comprises a pair of jaws movable to an open or closed position and motive means to move said jaws to an open or closed position.

3. The combination of claim 2 further including means selectively operated for controlling said motive means to open said wrench means, switch means mounted adjacent said wrench means and on one side thereof and operated to a closed position when said wrench means is rotated through a predetermined arc toward said switch means, and circuit means connecting said switch means to said control means for operating the same when said switch is closed.

4. The combination of claim 3 further including positioning means for said support means operable to provide movement of said wrench means perpendicular to the plane of said rotational movement of said wrench means.

References Cited in the file of this patent

UNITED STATES PATENTS

| | | |
|---|---|---|
| 1,984,622 | Babin | Dec. 18, 1934 |
| 2,311,225 | Grable | Feb. 16, 1943 |
| 2,639,894 | Smith | May 26, 1953 |